United States Patent [19]

Komatsubara et al.

[11] Patent Number: 4,463,394
[45] Date of Patent: Jul. 31, 1984

[54] TAPE RETAINING MECHANISM

[75] Inventors: Masahiro Komatsubara; Tetsuro Kamimura; Takugi Inanaga; Akira Takahashi, all of Saitama, Japan

[73] Assignee: Pioneer Electronic Corporation, Tokyo, Japan

[21] Appl. No.: 333,346

[22] Filed: Dec. 22, 1981

[30] Foreign Application Priority Data

Dec. 23, 1980 [JP] Japan .................. 55-184160[U]

[51] Int. Cl.³ .................. G11B 5/52; G11B 5/54; G11B 15/66
[52] U.S. Cl. .................. 360/96.5; 360/105
[58] Field of Search .................. 360/96.5, 105

[56] References Cited

FOREIGN PATENT DOCUMENTS 2245144 3/1974 Fed. Rep. of Germany ...... 360/105
2022701 4/1979 Fed. Rep. of Germany ...... 360/105

Primary Examiner—George G. Stellar
Attorney, Agent, or Firm—Sughrue, Mion, Zinn, Macpeak, and Seas

[57] ABSTRACT

A pair of spaced cassette retaining plates move to clamp the rear surface of a tape cassette when the head moves into engagement with the tape.

7 Claims, 2 Drawing Figures

TAPE RETAINING MECHANISM

BACKGROUND OF THE INVENTION

This invention relates to a tape recorder, and more particularly to cassette retaining plates in the tape recorder.

The invention is intended to provide a tape recorder in which the rattling of a cassette being loaded is eliminated by retaining the rear end face of the cassette in association with the forward movement of the head stand, whereby the magnetic tape is run smoothly, sound is recorded or reproduced with high fidelity, and vibration, noise and damage attributing to the rattling of the cassette half are eliminated.

SUMMARY OF THE INVENTION

Briefly, the present invention comprises a pair of retaining plates which are normally maintained in a retracted position but move to clamp the tape cassette securely in position when the tape head moves toward the tape. In the disclosed embodiment, a pair of pivoting arms each have one end coupled to a head stand on which the head is mounted, and their other ends are resiliently coupled to sliding plates on which the retaining plates are formed.

BRIEF DESCRIPTION OF THE DRAWINGS

One example of a tape recorder according to this invention will be described with reference to the accompanying drawings, in which.

DETAILED DESCRIPTION OF THE INVENTION

Figure 1:
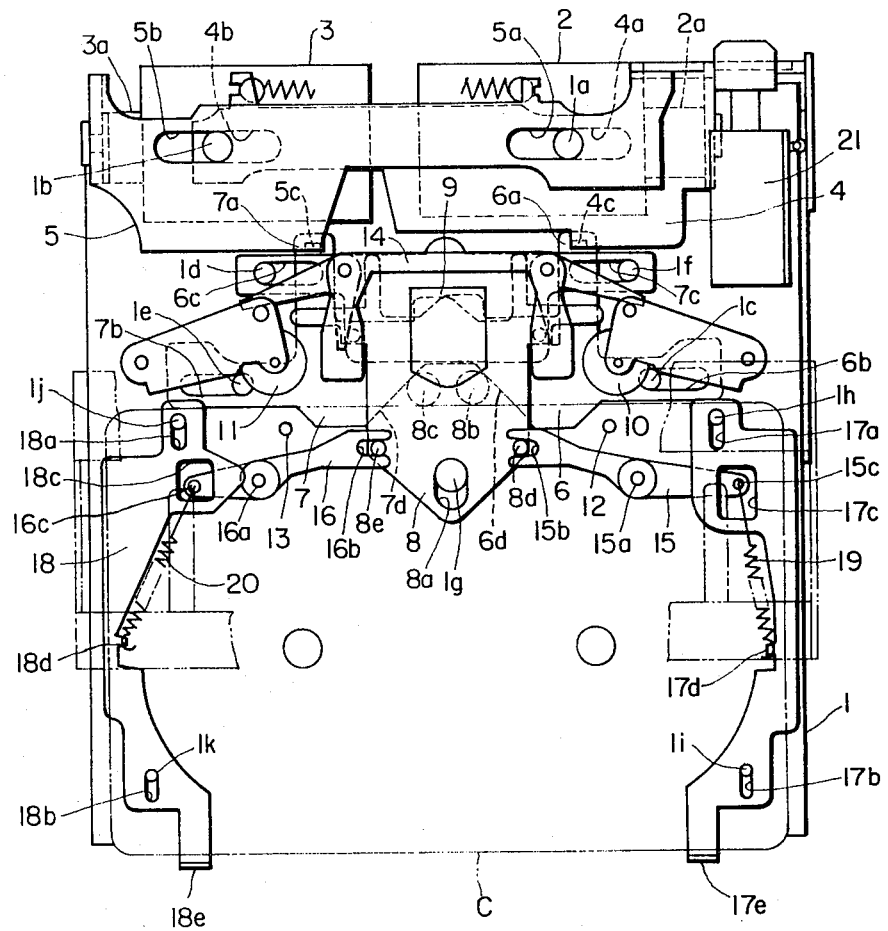
FIG. 1 is a plan view showing one example of a tape recorder retaining mechanism according to this invention.

In FIG. 1, reference numeral 1 designates a chassis at the rear of which two solenoids 2 and 3 are provided (in the upper portion of FIG. 1); and 4 and sliding plates 5, which are symmetrical in configuration with each other and are coupled respectively to the plungers 2a and 3a of the solenoids 2 and 3. The sliding plates 4 and 5 have elongated holes 4a and 4b and elongated holes 5a and 5b, respectively. The sliding plates 4 and 5, being guided by pins 1a and 1b secured to the chassis 1, are slid horizontally by the operation of the plungers 2a and 3a. Engaging protrusions 4c and 5c protrude downwardly from the sliding plates 4 and 5, respectively.

Sliding cam plates 6 and 7 are symmetrical in configuration with each other and have engaging holes 6a and 7a which are engaged with the engaging protrusions 4c and 5c, respectively. The sliding cam plates 6 and 7 have elongated holes 6b and 6c, and 7b and 7c, respectively. While being guided by pins 1c, 1d, 1e and 1f secured to the chassis 1 and engaged with the elongated holes 6b, 6c, 7b and 7c, the sliding cam plates 6 and 7 are moved horizontally. A head stand 8 is placed over the sliding cam plates 6 and 7. The head stand 8 has an elongated hole 8a. While being guided by a pin 1g secured to the chassis 1 and engaged with the elongated hole 8a, the head stand 8 is slid vertically in FIG. 1. The head stand 8 is pulled backwardly (or upwardly in FIG. 1) by a spring (not shown). Rollers 8b and 8c are provided on the lower surface of the head stand 8 in such a manner that they can abut against the cam surfaces 6d and 7d of the sliding cam plates 6 and 7, respectively.

A magnetic head 9 is set onto the upper surface of the head stand 8. Pinch rollers 10 and 11 are selectively abutted against capstan shafts 12 and 13, respectively, to move the magnetic tape in the forward direction or in the reverse direction.

Reference numeral 14 designates a cassette retaining leaf spring which is substantially U-shaped. The leaf spring 14 is mounted on the head stand 8 in such a manner as to surround the head 9.

Reference numerals 15 and 16 designate arms which are pivotally mounted on the frame 1 at 15a and 16a, respectively. Grooves 15b and 16b are formed in the inner end portions of the arms 15 and 16 and are engaged with pins 8d and 8e protruding from the upper surface of the head stand 8. Reference numerals 17 and 18 designate cassette retaining operation plates having elongated holes 17a and 17b, and 18a and 18b, respectively. While being guided by pins 1h, 1i, 1j and 1k secured to the chassis 1 and engaged with the elongated holes 17a, 17b, 18a and 18b, the operation plates 17 and 18 are moved back and forth (or vertically in FIG. 1). The operation plates 17 and 18 have openings 17c and 18c into which pins 15c and 16c embedded in the outer end portions of the arms 15 and 16 are respectively inserted. Tension springs 19 and 20 are connected between the locking piece 17d of the operation plate 17 and the pin 15c and between the locking piece 18d of the operation plate 18 and the pin 16c, respectively. Cassette retaining plates 17e and 18e are extended upwardly from the front end portions (or the lower end portions in FIG. 1) of the operation plates 17 and 18, respectively, to retain the rear end face of a cassette.

Reference numeral 21 designates a cassette holding solenoid.

With the tape recorder designed as described above, when the solenoid 2 is excited, the plunger 2a is pulled in, to move the sliding plate 4 toward the left. As the sliding plate 4 is moved leftward, the sliding cam plate 6 coupled to the sliding plate 4 is also moved to the left, so that the cam surface 6d pushes the roller 8b on the head stand 8, to move the head stand 8 forwardly.

Figure 2:
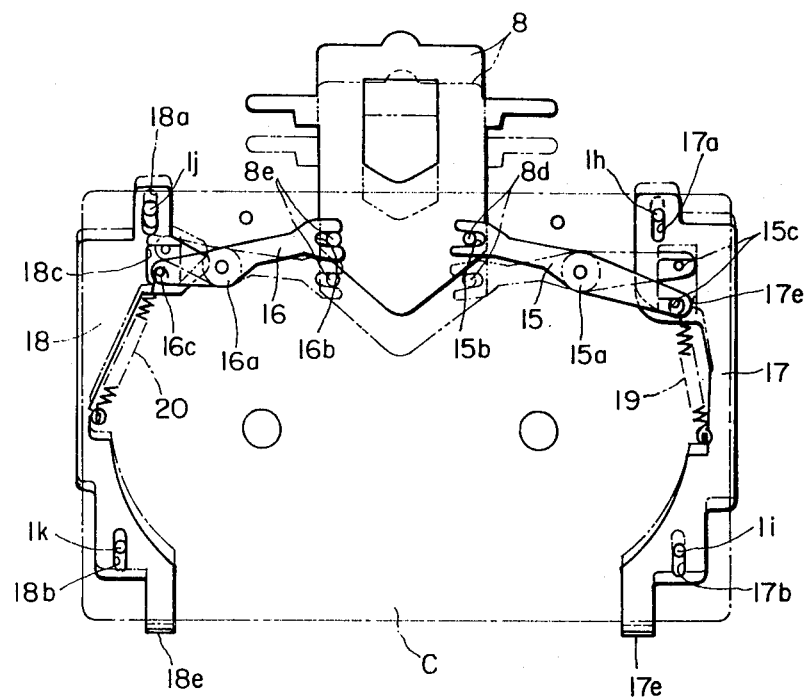
FIG. 2 is an explanatory diagram for a description of the operation of the essential components of the tape recorder in FIG. 1.

As the head 8 is moved forwardly from a position indicated by the solid line to a position indicated by the phantom line as shown in FIG. 2, the arm 15 coupled thereto is turned counterclockwise, while the arm 16 is turned clockwise. The cassette retaining operation plates 17 and 18 are coupled through the tension springs 19 and 20 to respective arms 15 and 16, and therefore, as the arms 15 and 16 are turned as described above, the operation plates 17 and 18 are elastically pulled upwardly in FIG. 2, so that the cassette retaining plates 17e and 18e, which are provided by bending the front end portions of the operation plates 17 and 18, retain the rear end face of the cassette being loaded.

As described above, the cassette retaining plates are maintained in a retracted position in association with the head stand before a cassette is loaded, and therefore the cassette can be smoothly loaded. In a play or an automatic music selection, the cassette retaining plates are moved forwardly with the forward movement of the head, to elastically retain the rear end face of the cassette. Therefore, the cassette is snugly set, and the tape can be run stably. Furthermore, since the vibration noise of the cassette is eliminated, sound can be recorded and reproduced with high fidelity.

It should be appreciated that various modifications could be made to the above-disclosed embodiment without departing from the spirit and scope of this invention. For example, a single retaining plate could be used which would preferably be substantially wider than the small tabs 17e and 18e, or the two small retaining plates 17e and 18e could be mounted on a single operation plate.

What is claimed is:

1. In a tape machine of the type wherein a tape head mounted on a head stand is movable between a first position out of contact with a cassette tape and a second position in which said head contacts said cassette tape, said cassette tape being wound in a cassette having a front surface through which said tape is exposed to said head and also having a rear surface, a tape retaining mechanism comprising:

at least one cassette retaining plate for engaging said rear surface of said cassette; and moving means for moving said retaining plate in association with movement of said head stand for engaging and securing said cassette, wherein said at least one retaining plate secures said cassette in response to movement of said head stand toward said second position.

2. A tape retaining mechanism as claimed in claim 1, wherein said at least one retaining plate comprises two retaining plates for engaging said cassette at different locations.

3. A tape retaining mechanism as claimed in claim 1, wherein said moving means comprises:

slidable operation plate means carrying said retaining plate; and coupling means coupled to said operation plate means for moving said operation plate means in response to movement of said head stand.

4. A tape retaining mechanism as claimed in claim 3, wherein said coupling means comprises pivotable lever means coupled on one side of its pivot point to said head stand and on the other side of its pivot point to said operation plate means.

5. A tape retaining mechanism as claimed in claim 4, wherein said lever means is resiliently coupled to said operation plate means.

6. A tape retaining mechanism as claimed in claim 5, wherein said at least one retaining plate comprises first and second retaining plates, said operation plate means comprises first and second operation plates each carrying one of said retaining plates, and said lever means comprises first and second levers each coupling one of said operation plates to said head stand.

7. In a tape machine of the type wherein a tape head mounted on a head stand is moveable between a first position out of contact with a cassette tape and a second position in which said head contacts said cassette tape, said cassette tape being wound in a cassette having a front surface through which said tape is exposed to said head and also having a rear surface, a tape retaining mechanism comprising:

at least one cassette retaining plate;

slidable operation plate;

coupling means for moving said operation plate in a direction opposite the direction of head movement; and resilient coupling means for coupling said head stand to said at least one cassette retaining plate, wherein said at least one retaining plate contacts said rear surface of said cassette and secures said tape cassette when said head contacts said cassette tape.

* * * * *